US011418401B2

(12) United States Patent
Hanes et al.

(10) Patent No.: US 11,418,401 B2
(45) Date of Patent: *Aug. 16, 2022

(54) HIERARCHICAL FOG NODES FOR CONTROLLING WIRELESS NETWORKS

(71) Applicant: Cisco Technology, Inc., San Jose, CA (US)

(72) Inventors: M. David Hanes, Lewisville, NC (US); Charles Calvin Byers, Wheaton, IL (US); Joseph Michael Clarke, Cary, NC (US); Gonzalo Salgueiro, Raleigh, NC (US); Jerome Henry, Pittsboro, NC (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,382

(22) Filed: Feb. 25, 2021

(65) Prior Publication Data

US 2021/0184935 A1 Jun. 17, 2021

Related U.S. Application Data

(63) Continuation of application No. 15/795,723, filed on Oct. 27, 2017, now Pat. No. 10,965,534.

(51) Int. Cl.
*G06F 15/173* (2006.01)
*H04L 41/0896* (2022.01)
(Continued)

(52) U.S. Cl.
CPC .......... *H04L 41/0896* (2013.01); *H04L 41/14* (2013.01); *H04L 43/0894* (2013.01);
(Continued)

(58) Field of Classification Search
CPC ... H04L 67/12; H04L 41/0893; H04L 41/046; H04L 41/12; H04L 43/08; H04L 41/16
See application file for complete search history.

(56) References Cited

U.S. PATENT DOCUMENTS 8,270,315 B2 * 9/2012 Aaron ..................... H04L 67/32
455/452.2
2011/0009105 A1 * 1/2011 Lee ....................... H04B 7/0695
455/418
(Continued)

FOREIGN PATENT DOCUMENTS

EP 3116198 A1 11/2017
WO 2017066350 A1 4/2017

OTHER PUBLICATIONS

Wikipedia, "Cognitive radio", https://en.wikipedia.org/wiki/Cognitive_radio, Mar. 11, 2019,10 pages.
(Continued)

*Primary Examiner* — Oleg Survillo
(74) *Attorney, Agent, or Firm* — Edell, Shapiro & Finnan, LLC

(57) ABSTRACT

A method includes obtaining performance characterization values from endpoints managed by a first fog node at a first hierarchical level in a hierarchy of fog nodes. The method includes changing a first operating characteristic of the wireless network based on the performance characterization values. The first operating characteristic affects the operation of one or more of the endpoints. The method includes transmitting a portion of the performance characterization values to a second fog node at a second hierarchical level in the hierarchy of fog nodes. The method includes changing a second operating characteristic of the wireless network based on an instruction from the second fog node. The second operating characteristic affects the operation of the first fog node and/or other fog nodes at the first hierarchical
(Continued)

level. Changing one or more of the first operating characteristic and the second operating characteristic satisfies an operating threshold for the wireless network.

20 Claims, 5 Drawing Sheets

(51) Int. Cl.
*H04L 41/14* (2022.01)
*H04L 43/0894* (2022.01)
*H04L 67/1001* (2022.01)
*H04L 41/0823* (2022.01)
*H04L 67/12* (2022.01)

(52) U.S. Cl.
CPC ...... *H04L 41/0823* (2013.01); *H04L 67/1002* (2013.01); *H04L 67/12* (2013.01)

(56) References Cited

U.S. PATENT DOCUMENTS

| | | | |
|---|---|---|---|
| 2012/0093032 A1* | 4/2012 | Venkatachalam | H04W 24/02 370/255 |
| 2015/0036482 A1* | 2/2015 | Schmidt | H04W 28/0284 370/221 |
| 2016/0182639 A1 | 6/2016 | Hong et al. | |
| 2017/0006483 A1 | 1/2017 | Attanasio et al. | |
| 2017/0048308 A1 | 2/2017 | Qaisar | |
| 2017/0060574 A1 | 3/2017 | Malladi et al. | |
| 2017/0244601 A1 | 8/2017 | Byers et al. | |
| 2018/0159745 A1 | 6/2018 | Byers et al. | |
| 2018/0309821 A1 | 10/2018 | Byers et al. | |
| 2019/0132206 A1 | 5/2019 | Hanes et al. | |

OTHER PUBLICATIONS

Wikipedia, "Fog computing", https://en.wikipedia.org/wiki/Fog_computing, Feb. 11, 2019, 5 pages.
Wikipedia, "Wireless site survey", https://en.wikipedia.org/wiki/Wireless_site_survey, Mar. 8, 2019, 3 pages.
Weebly, "WISP DRONE", https://web.archive.org/web/20170509131943/http://wispdrone.weebly.com/site-survey.html, May 9, 2017, 3 pages.
Cisco Systems, Inc., "Cisco CleanAir- Cisco Unified Wireless Network Design Guide", Document ID: 112139, Sep. 28, 2010, 38 pages.
Zhenyu Wen et al., "Fog Orchestration for Internet of Things Services", Mar./Apr. 2017, 9 pages.
Munam Ali Shah et al., "Cognitive Radio Networks for Internet of Things: Applications, Challenges and Future", Proceedings of the 19th International Conference on Automation & Computing, Brunel University, London, UK, 13-14, Sep. 2013, 6 pages.
Athar Ali Khan et al., "When Cognitive Radio Meets The Internet of Things?", Sep. 5-9, 2016, 6 pages.

* cited by examiner

HIERARCHICAL FOG NODES FOR CONTROLLING WIRELESS NETWORKS

CROSS-REFERENCE TO RELATED APPLICATION

This application is a continuation of and claims the benefit of priority to U.S. patent application Ser. No. 15/795,723, filed Oct. 27, 2017, the entire contents of which are incorporated herein by reference.

TECHNICAL FIELD

The present disclosure relates generally to wireless networks, and in particular, to hierarchical fog nodes for controlling wireless networks.

BACKGROUND

In some previously available networks, various operating characteristics of the network are set when certain components of the network are installed. For example, in some previously available networks, a frequency at which a network node communicates is set when the network node is installed and/or provisioned. Similarly, in some previously available networks, a bandwidth allocation for a device is set when the device is provisioned with the network. In some scenarios, when network conditions change the operating characteristics of the network are no longer suitable. For example, as interference at a particular frequency increases (e.g., due to more devices communicating at the frequency), the frequency is no longer suitable for communicating. As such, as network conditions change, certain operating characteristics of the network may need to be changed as well.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
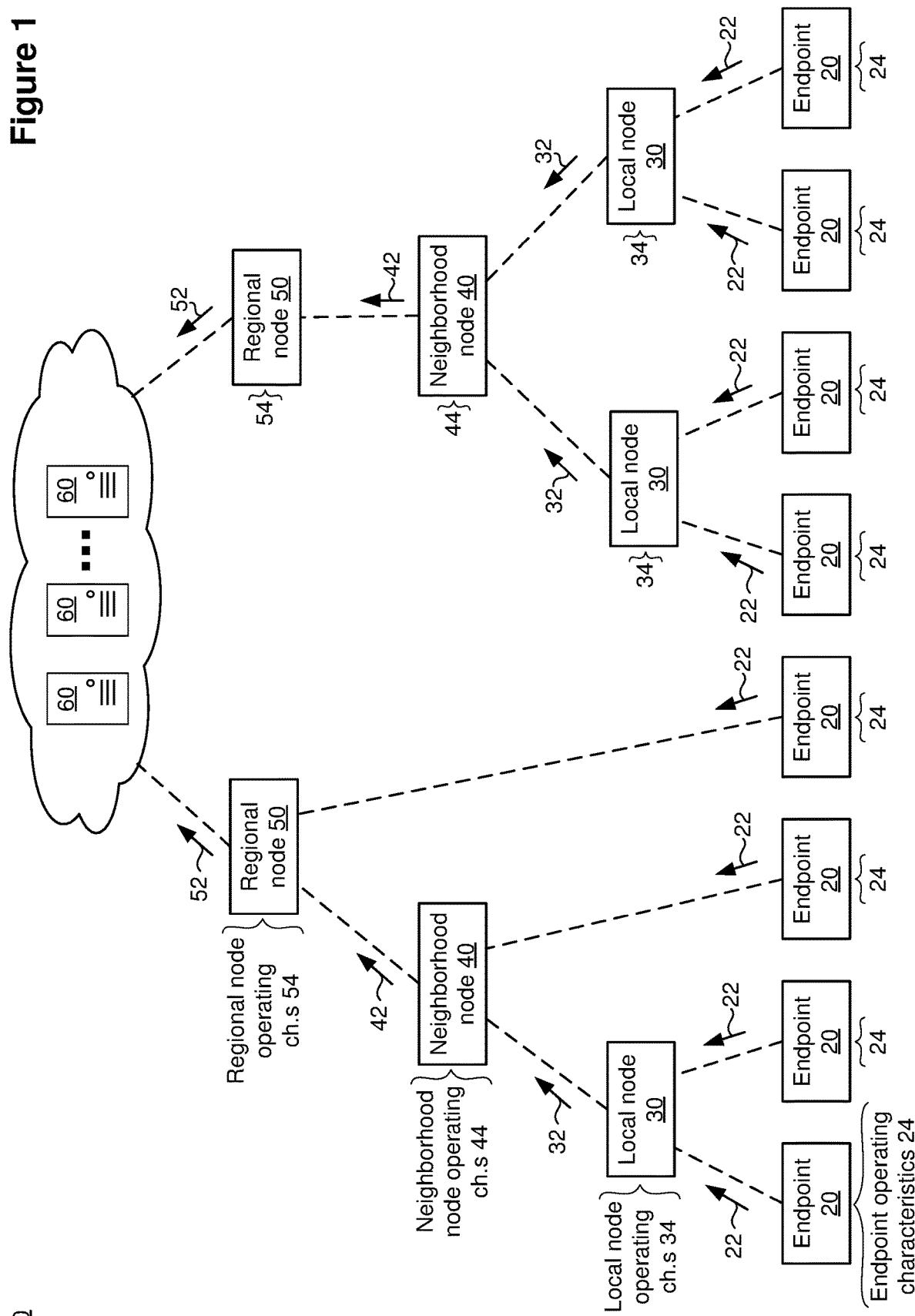
FIG. 1 is a schematic diagram of a network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for changing operating characteristics of a wireless network. In some implementations, a method is performed by a first fog node associated with a first hierarchical level in a hierarchy of fog nodes that are configured to collectively manage a wireless network. In some implementations, the first fog node includes a receiver, a non-transitory memory, and one or more processors coupled with the receiver and the non-transitory memory. In some implementations, the method includes obtaining performance characterization values from one or more of a plurality of endpoints managed by the first fog node. In some implementations, the method includes changing a first operating characteristic of the wireless network based on the performance characterization values. In some implementations, the first operating characteristic affects the operation of one or more of the plurality of endpoints. In some implementations, the method includes transmitting a portion of the performance characterization values to a second fog node at a second hierarchical level in the hierarchy of fog nodes. In some implementations, the method includes changing a second operating characteristic of the wireless network based on an instruction from the second fog node. In some implementations, the second operating characteristic affects the operation of one or more of the first fog node and other fog nodes at the first hierarchical level. In some implementations, changing one or more of the first operating characteristic and the second operating characteristic satisfies an operating threshold for the wireless network.

Example Embodiments

FIG. 1 is a schematic diagram of a network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes endpoints 20, local fog nodes 30, neighborhood fog nodes 40, regional fog nodes 50 and cloud computing servers 60. In various implementations, the local fog nodes 30, the neighborhood fog nodes 40, the regional fog nodes 50 and the cloud computing servers 60 form a hierarchy that controls various operating characteristics of a wireless network (e.g., a cellular network such as a fifth-generation (5G) cellular network). In some implementations, the endpoints 20, the local fog nodes 30, the neighborhood fog nodes 40, the regional fog nodes 50 and/or the cloud computing servers 60 form a portion of the wireless network. For example, in some implementations, the local fog nodes 30 reside at respective base stations (e.g., eNode Bs (eNBs)), and the endpoints 20 represent radio equipment at the base station(s).

In various implementations, the local fog node(s) 30, the neighborhood fog node(s) 40, the regional node(s) 50 and/or the cloud computing server(s) 60 control one or more operating characteristics of the wireless network (e.g., the network environment 10). In some implementations, the local fog node(s) 30, the neighborhood fog node(s) 40, the regional node(s) 50 and/or the cloud computing server(s) 60 change an operating characteristic of the wireless network, thereby changing how the wireless network operates. In some implementations, changing an operating characteristic of the wireless network includes changing modulation, communication channel/frequency, directionality, power of transmitted signals, receiver parameters, bandwidth allocation and/or radio protocols. In various implementations, the local fog node(s) 30, the neighborhood fog node(s) 40, the regional node(s) 50 and/or the cloud computing server(s) 60 change the operating characteristic(s) of the wireless network based on network condition(s) measured (e.g., reported) by the endpoints 20. In some implementations, the network conditions indicate signal propagation, signal-to-noise ratio (SNR), signal attenuation, signal reflection, interference, multi-path, cross-talk, distortion, jamming, round trip time, packet loss, retransmission rate, data throughput, etc.

In various implementations, the endpoints 20 generate endpoint performance characterization values 22 that indicate a performance of the wireless network. In various implementations, the endpoints 20 include Internet of Things (IoT) devices such as sensors and/or radio frequency (RF) telemetry devices. For example, in some implementations, a particular endpoint 20 includes a sensor (e.g., a temperature sensor), and the endpoint performance characterization values 22 generated by that particular endpoint 20 include sensor measurements (e.g., temperature readings). In some implementations, a particular endpoint 20 includes an RF telemetry device (e.g., an RF power meter, a spectrum analyzer, analog/digital radio receivers, etc.), and the endpoint performance characterization values 22 generated by that particular endpoint 20 include RF telemetry measurements (e.g., signal propagation, SNR, signal attenuation, signal reflection, interference, multi-path, cross-talk, distortion, jamming, round trip time, packet loss, retransmission rate, data throughput, etc.) for a portion of network environment 10 that is within range of an antenna of the endpoint 20. In some implementations, an endpoint 20 (e.g., each endpoint 20) transmits the endpoint performance characterization values 22 to a fog node that controls the endpoint 20 (e.g., to a local fog node 30).

In various implementations, the endpoints 20 are associated with endpoint operating characteristics 24 that define how the endpoints 20 operate. For example, in some implementations, the endpoint operating characteristics 24 of a particular endpoint 20 indicate a bandwidth allocation, a communication channel/frequency, a directionality, a transmission power level, a receiver parameter and/or a radio protocol for that particular endpoint 20. In some implementations, a local fog node 30 that controls a particular endpoint 20 changes one or more of the endpoint operating characteristics 24 of that particular endpoint 20 based on the endpoint performance characterization values 22. For example, in some implementations, a local fog node 30 that controls a particular endpoint 20 changes a bandwidth allocation for that particular endpoint 20 based on the endpoint performance characterization values 22.

In some implementations, a local fog node 30 generates local performance characterization values 32 that indicate a performance of the local fog node 30 and/or the endpoints 20 controlled by the local fog node 30. In some implementations, the local fog node 30 generates the local performance characterization values 32 by selecting a portion of the endpoint performance characterization values 22. For example, the local fog node 30 filters out (e.g., discards) a portion of the endpoint performance characterization values 22 that are actionable by the local fog node 30, and uses the remaining endpoint performance characterization values 22 as the local performance characterization values 22. In some implementations, the local performance characterization values 32 include data in addition to the endpoint performance characterization values 22.

In some implementations, the local fog node 30 generates the local performance characterization values 32 based on a function of the endpoint performance characterization values 22 that the local fog node 30 obtains from the endpoints 20 that the local fog node 30 controls. For example, in some implementations, the local performance characterization values 32 are an average/mean of the endpoint performance characterization values 22. In some implementations, the local fog node 30 utilizes methods and/or systems associated with machine learning to generate the local performance characterization values 32. For example, in some implementations, the local fog node 30 uses machine learning to assign different weights/ranks to the endpoint performance characterization values 22. In some implementations, the local fog node 30 uses machine learning to discard a portion of the endpoint performance characterization values 22 that are likely erroneous. In various implementations, the local fog nodes 30 transmit the local performance characterization values 32 to a fog node that controls the local fog nodes 30 (e.g., to a neighborhood fog node 40).

In various implementations, the local fog nodes 30 are associated with local operating characteristics 34 that define how the local fog nodes 30 operate. For example, in some implementations, the local operating characteristics 34 of a particular local fog node 30 indicate a number/type of endpoints 20 controlled by that particular local fog node 30, a communication channel/frequency, a directionality, a transmission power level, a receiver parameter and/or a radio protocol for that particular local fog node 30. In some implementations, a neighborhood fog node 40 that controls a particular local fog node 30 changes one or more of the local operating characteristics 34 of that particular local fog node 30 based on the local performance characterization values 32. For example, in some implementations, a neighborhood fog node 40 that controls a local fog node 30 instructs the local fog node 30 to reduce the reporting frequency of the endpoint performance characterization values 22 (e.g., in order to reduce network congestion). In some implementations, a neighborhood fog node 40 that controls a particular local fog node 30 changes one or more of endpoint operating characteristics 24 of endpoints 20 controlled by that particular local fog node 30. For example, in some implementations, a neighborhood fog node 40 that controls a particular local fog node 30 changes a communication channel/frequency for one or more endpoints 20 that are controlled by that particular local fog node 30 based on the local performance characterization values 32, and/or according to a radio spectrum coordination plan.

In some implementations, a neighborhood fog node 40 generates neighborhood performance characterization values 42 that indicate a performance of the neighborhood fog node 40, the local fog node(s) 30 controlled by the neighborhood fog node 40 and/or the endpoints 20 controlled by the local fog node(s) 30. In some implementations, the neighborhood fog node 40 generates the neighborhood performance characterization values 42 by selecting a portion of the local performance characterization values 32. For example, the neighborhood fog node 40 filters out a portion of the local performance characterization values 32 that are actionable by the neighborhood fog node 40.

In some implementations, a neighborhood fog node 40 utilizes analytics algorithms to process the local performance characterization values 32 and/or to generate the neighborhood performance characterization values 42 (e.g., to reduce a size of the local performance characterization values 32). In some implementations, the neighborhood fog node 40 generates the neighborhood performance characterization values 42 based on a function of the local performance characterization values 32 that the neighborhood fog node 40 obtains from the local fog nodes 30 that the neighborhood fog node 40 controls. For example, in some implementations, the neighborhood performance characterization values 42 are an average/mean of the local performance characterization values 32. In some implementations, the neighborhood fog node 40 utilizes methods and/or systems associated with machine learning to generate the neighborhood performance characterization values 42. For example, in some implementations, the neighborhood fog node 40 uses machine learning to assign different weights/ranks to the local performance characterization values 32. In some implementations, the neighborhood fog node 40 uses machine learning to discard a portion of the local performance characterization values 32 that are likely erroneous. In some implementations, the neighborhood performance characterization values 42 include data in addition to the local performance characterization values 32. In various implementations, the neighborhood fog nodes 40 transmit the neighborhood performance characterization values 42 to a fog node that controls the neighborhood fog nodes 40 (e.g., to a regional fog node 50).

In various implementations, the neighborhood fog nodes 40 are associated with neighborhood operating characteristics 44 that define how the neighborhood fog nodes 40 operate. For example, in some implementations, the neighborhood operating characteristics 44 of a particular neighborhood fog node 40 indicate a number/type of local fog nodes 30 controlled by that particular neighborhood fog node 40, a number/type of endpoints 20 controlled (e.g., indirectly controlled, via a local fog node 30) by that particular neighborhood fog node 40, a communication channel/frequency, a directionality, a transmission power level, a receiver parameter and/or a radio protocol for that particular neighborhood fog node 40. In some implementations, a regional fog node 50 that controls a particular neighborhood fog node 40 changes one or more of the neighborhood operating characteristics 44 of that particular neighborhood fog node 40 based on the neighborhood performance characterization values 42. For example, in some implementations, a regional fog node 50 that controls a neighborhood fog node 40 instructs the neighborhood fog node 40 to transfer control of a local fog node 30 to another neighborhood fog node 40 (e.g., in order to re-balance load between the neighborhood fog nodes 40). In some implementations, a regional fog node 50 changes one or more of the local operating characteristics 34 of downstream local fog nodes 30. In some implementations, a regional fog node 50 changes one or more of the endpoint operating characteristics 24 of downstream endpoints 20.

In some implementations, a regional fog node 50 generates regional performance characterization values 52 that indicate a performance of the regional fog node 50, the neighborhood fog node(s) 40 controlled by the regional fog node 50, downstream local fog node(s) 30 (e.g., local fog node(s) 30 controlled by the neighborhood fog node(s) 40) and/or downstream endpoints 20 (e.g., endpoint(s) 20 controlled by the local fog node(s) 30). In some implementations, the regional fog node 50 generates the regional performance characterization values 52 by selecting a portion of the neighborhood performance characterization values 42. For example, the regional fog node 50 filters out a portion of the neighborhood performance characterization values 42 that are actionable by the regional fog node 50.

In some implementations, a regional fog node 50 utilizes analytics algorithms to process the neighborhood performance characterization values 42 and/or to generate the regional performance characterization values 52 (e.g., to reduce a size of the neighborhood performance characterization values 42). In some implementations, the regional fog node 50 generates the regional performance characterization values 52 based on a function of the neighborhood performance characterization values 42 that the regional fog node 50 obtains from the neighborhood fog nodes 40 that the regional fog node 50 controls. For example, in some implementations, the regional performance characterization values 52 are an average/mean of the neighborhood performance characterization values 42. In some implementations, the regional fog node 50 utilizes methods and/or systems associated with machine learning to generate the regional performance characterization values 52. For example, in some implementations, the regional fog node 50 uses machine learning to assign different weights/ranks to the neighborhood performance characterization values 42. In some implementations, the regional fog node 50 uses machine learning to discard a portion of the neighborhood performance characterization values 42 that are likely erroneous. In some implementations, the regional performance characterization values 52 include data in addition to the neighborhood performance characterization values 42. In various implementations, the regional fog nodes 50 transmit the regional performance characterization values 52 to the cloud computing servers 60.

In various implementations, the regional fog nodes 50 are associated with regional operating characteristics 54 that define how the regional fog nodes 50 operate. For example, in some implementations, the regional operating characteristics 54 of a particular regional fog node 50 indicate a number/type of neighborhood fog nodes 40 controlled by that particular regional fog node 50, a number/type of local fog nodes 30 controlled (e.g., indirectly controlled, via a neighborhood fog node 40) by that particular regional fog node 50, a number/type of endpoints 20 controlled (e.g., indirectly controlled, via a local fog node 30) by that particular regional fog node 50, a communication channel/frequency, a directionality, a transmission power level, a receiver parameter and/or a radio protocol for that particular regional fog node 50. In some implementations, the cloud computing servers 60 change one or more of the regional operating characteristics 54 of a regional fog node 50. For example, in some implementations, the cloud computing servers 60 perform troubleshooting operations that improve the operation of the regional fog nodes 50, the neighborhood fog nodes 40, the local fog nodes 30 and/or the endpoints 20.

As illustrated in FIG. 1, in various implementations, the local fog nodes 30, the neighborhood fog nodes 40, the regional fog nodes 50 and the cloud computing servers 60 form a hierarchy. In the example of FIG. 1, the local fog nodes 30 are at the lowest level of computing in the hierarchy, the neighborhood fog nodes 40 are at a hierarchical level that is above the local fog nodes 30, the regional fog nodes 50 are at a hierarchical level that is above the neighborhood fog nodes 40, and the cloud computing servers 60 are at a hierarchical level that is above the regional fog nodes 50. In other words, in the example of FIG. 1, the local fog nodes 30 are at the lowest level of the hierarchy and the cloud computing servers 60 are at the highest level of the hierarchy. In some implementations, nodes at different levels of the hierarchy have different amounts of computing resources (e.g., different amounts of processing power, different amounts of memory, etc.). For example, in some implementations, the cloud computing servers 60 have the largest amounts of computing resources, and the local fog nodes 30 have the smallest amounts of computing resources. In some implementations, the local fog nodes 30 have the least data storage resources in the hierarchy, while the cloud computing servers 60 have the most data storage resources in the hierarchy.

In various implementations, different operating characteristics of the wireless network are controlled by fog nodes at different hierarchical levels. For example, in some implementations, changes to operating characteristics that require fewer computing resources are performed by fog nodes at the lower hierarchical levels (e.g., the local fog nodes 30 and/or the neighborhood fog nodes 40), and changes to operating characteristics that require greater computing resources are performed by fog nodes at the higher hierarchical levels (e.g., the regional fog nodes 50 and/or the cloud computing servers 60). In some implementations, operating characteristics that require more frequent changes are controlled by fog nodes at the lower hierarchical levels (e.g., the local fog nodes 30 and/or the neighborhood fog nodes 40), and operating characteristics that require less frequent changes are controlled by fog nodes at the higher hierarchical levels (e.g., the regional fog nodes 50 and/or the cloud computing servers 60). In some implementations, operating characteristics whose adjustment requires the lowest latency are controlled by fog nodes at the lower hierarchical levels (e.g., the local fog nodes 30 and/or the neighborhood fog nodes 40), and operating characteristics with less stringent latency requirements are controlled by fog nodes at the higher hierarchical levels (e.g., the regional fog nodes 50 and/or the cloud computing servers 60). More generally, in various implementations, fog nodes at different hierarchical levels control different operating characteristics based on the amount of computing resources associated with (e.g., required to change) the operating characteristics and/or the frequency with which the operating characteristics are changed.

In some implementations, a portion of the network environment 10 is deployed at a mining facility (e.g., a precious metals mine). In such implementations, the endpoints 20 are situated at various locations within the mining facility. For example, in some implementations, a haul truck includes various endpoints 20 (e.g., sensors such as temperature sensors, image sensors, etc. and/or RF spectrum analyzers that capture a Wi-Fi signal strength and a cellular signal strength). As the haul truck moves around, the haul truck transmits a significant amount of data (e.g., sensor measurements captured by the sensors and/or RF telemetry data captured by the spectrum analyzers). In some instances, certain areas of the mining facility receive poor Wi-Fi coverage, while other areas of the mining facility suffer from poor cellular signal strength. In some implementations, a local fog node 30 at the mining facility determines whether the haul truck utilizes Wi-Fi or cellular to transmit data. In some implementations, the local fog node 30 makes the determination based on the endpoint performance characterization values 22 that the local fog node 30 receives from endpoints 20 on the haul truck and/or endpoints 20 that are distributed across the mining facility. In some implementations, the local fog node 30 has access to a route of the haul truck. In such implementations, the local fog node 30 utilizes endpoint performance characterization values 22 from endpoints 20 that are on the route (e.g., expected route) of the haul truck. In some implementations, the local fog node 30 switches the haul truck from Wi-Fi to cellular before the haul truck enters a portion of the route with no/poor Wi-Fi, thereby preventing a coverage outage for the haul truck. In some implementations, the local fog node 30 increases a bandwidth allocation for the haul truck and reduces the bandwidth allocation for other haul trucks that are idle, for example, if the haul truck needs to transmit more data. More generally, in various implementations, the local fog node 30 changes various operating characteristics 24 of endpoints 20 located at the haul truck based on endpoint performance characterization values 22 from various endpoints 20 thereby improving the operability of the haul truck.

In some implementations, a portion of the network environment 10 is deployed at a container port with various stacks of metal containers. The RF environment at a container port typically varies as the positions of the containers changes. In some implementations, the endpoints 20 are distributed across the container port. The endpoints 20 provide endpoint performance characterization values 22 (e.g., RF telemetry data) to local fog nodes 30 that control the endpoints 20. As containers are moved around, the RF environment of the container port changes. The local fog nodes 30, the neighborhood fog nodes 40, the regional fog nodes 50 and/or the cloud computing servers 60 change operating characteristics of the wireless network based on the changes in the RF environment indicated by the endpoint performance characterization values 22 so that the wireless network performs in accordance with an operability threshold. For example, in some implementations, the neighborhood fog nodes 40 allocate different communication channels/frequencies to certain devices (e.g., in order to satisfy an interference threshold, for example, in order to maintain interference below an interference threshold). In some implementations, a fog node in the network environment 10 deactivates a device that is operating outside of defined operational parameters (e.g., a regional fog node 50 shuts down an uncompliant transmitter on a ship docked at the container port).

In some implementations, a network operator entity utilizes the network environment 10 to control a threshold amount of spectrum (e.g., a limited amount of spectrum) available to the network operator entity. For example, in some implementations, the network operator entity utilizes the network environment 10 (e.g., the hierarchy of fog nodes) to control a spectrum that corresponds to Narrow-Band IoT (NB-IoT). In such implementations, the network environment 10 allows the network operator entity to reuse a limited number of communication channels/frequencies in the spectrum efficiently.

Figure 2:
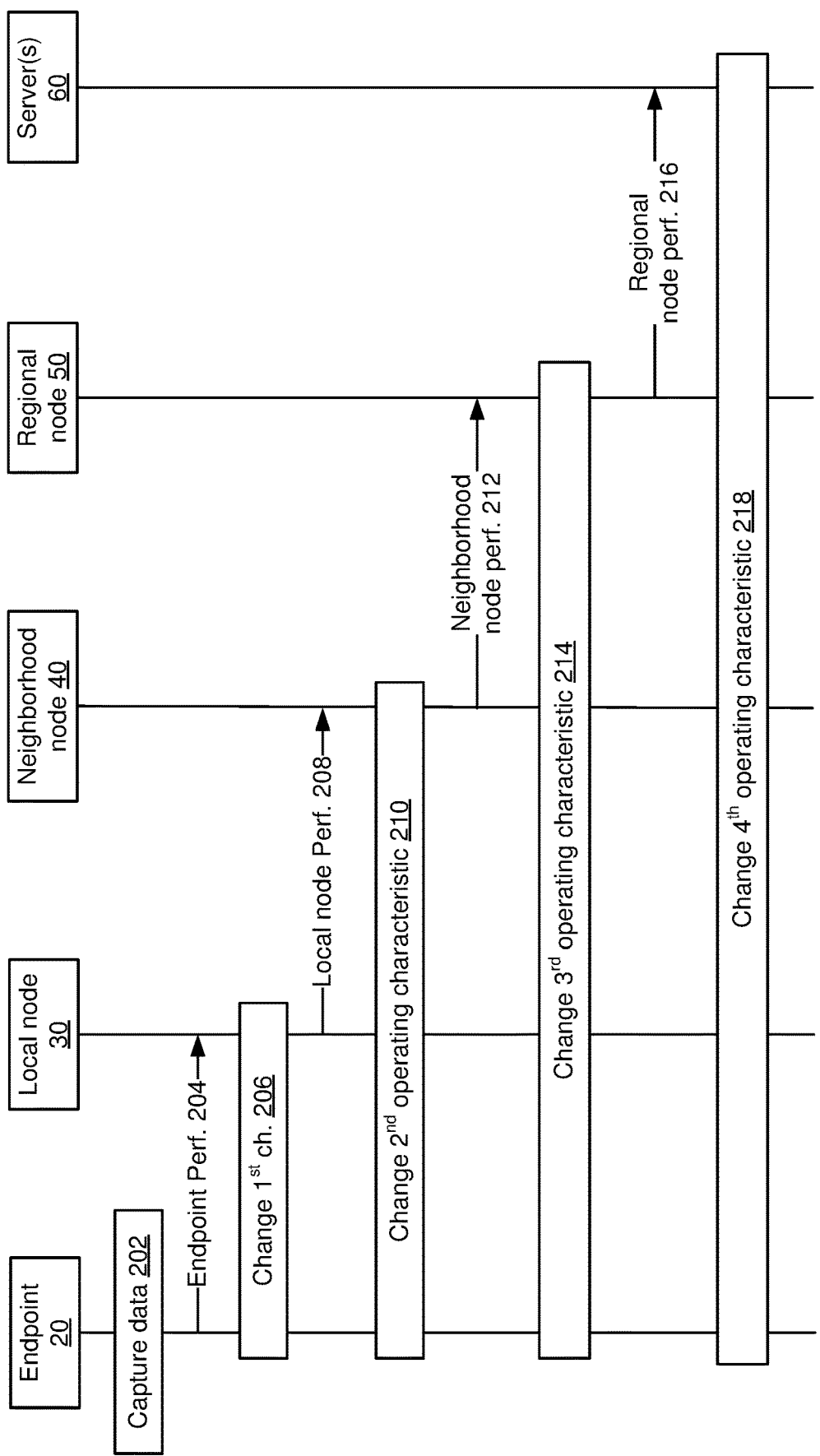
FIG. 2 is a sequence diagram illustrating operations performed by various nodes in accordance with some implementations.

FIG. 2 is a sequence diagram illustrating operations performed by various nodes in accordance with some implementations. At 202, the endpoints 20 generate (e.g., capture) endpoint performance characterization values 22 that indicate a performance of the wireless network. For example, in some implementations, the endpoints 20 include sensors that capture sensor measurements. As an example, in some implementations, an endpoint 20 includes a temperature sensor that captures temperature readings. In some implementations, the endpoints 20 include RF telemetry devices (e.g., RF power meters, spectrum analyzers, analog/digital radio receivers, etc.) that capture RF telemetry data. As an example, in some implementations, the RF telemetry data indicates the SNR, a level of distortion, a level of interference, etc.

At 204, the endpoints 20 transmit the endpoint performance characterization values 22 to corresponding local fog nodes 30 that control the endpoints 20. In some implementations, the endpoints 20 transmit the endpoint performance characterization values 22 to the local fog nodes 30 periodically. For example, in some implementations, the endpoints 20 collect a batch of endpoint performance characterization values 22, and transmit the batch of endpoint performance characterization values 22 at a predetermined time interval. In some implementations, the endpoints 20 transmit the endpoint performance characterization values 22 to the local fog nodes in response to receiving a request for the endpoint performance characterization values 22. For example, in some implementations, the local fog nodes 30 request the endpoint performance characterization values 22, and the endpoints 20 transmit the endpoint performance characterization values 22 in response to the request. In some implementations, the endpoints 20 transmit the endpoint performance characterization values 22 to the local fog nodes 30 in response to a threshold being breached (e.g., in response to a measurement being outside a specified range).

At 206, a local fog node 30 changes an operating characteristic of the wireless network based on the endpoint performance characterization values 22. In some implementations, the local fog node 30 changes an endpoint operating characteristic 24. For example, in some implementations, the local fog node 30 transmits an instruction to an endpoint 20 to change one of its endpoint operating characteristics 24. As an example, in some implementations, the local fog node 30 increases a bandwidth allocation for an endpoint 20 based on an endpoint performance characterization value 22 which indicates that the endpoint 20 needs to transmit more data (e.g., more sensor measurements). In some implementations, the local fog node 30 changes one of its local operating characteristics 34 based on the endpoint performance characterization values 22. As an example, in some implementations, the local fog node 30 changes a frequency at which the local fog node 30 requests the endpoints 20, which the local fog node 30 controls, for their endpoint performance characterization values 22. In some implementations, the local fog nodes 30 change operating characteristics whose adjustment requires less than a threshold amount of computing resources. In some implementations, the local fog nodes 30 change operating characteristics that are time sensitive (e.g., operating characteristics that require changes within a threshold amount of time). As an example, in some implementations, the local fog nodes 30 change operating characteristics that are related to local RF environment monitoring (e.g., changing RF monitoring frequency based on network conditions reported by endpoints 20), local radio resource control (RRC), and/or peer-peer networking. In some implementations, the local fog node 30 changes operational parameters of analytics algorithms that the local fog node 30 uses to evaluate the endpoint performance characterization values 22.

At 208, the local fog nodes 30 transmit local performance characterization values 32 to the neighborhood fog nodes 40 that control the local fog nodes 30. In some implementations, a local fog node 30 generates its local performance characterization values 32 by selecting a portion of the endpoint characterization values 22 that the local fog node 30 receives. For example, in some implementations, the local fog node 30 filters out the endpoint performance characterization values 22 that the local fog node 30 has already processed (e.g., acted upon). As described herein, in some implementations, the local fog nodes 30 utilize data analytics and/or machine learning to generate the local performance characterization values 32. In some implementations, the local fog nodes 30 transmit the local performance characterization values 32 to their controlling neighborhood fog nodes 40 periodically. In some implementations, a local fog node 30 transmits its local performance characterization values 32 in response to a request from the neighborhood fog node 40 that controls the local fog node 30. In some implementations, the local fog nodes 30 transmit the local performance characterization values 32 in response to a breach (e.g., when one of the local performance characterization values 32 is outside a defined range).

At 210, the neighborhood fog node 40 changes an operating characteristic of the wireless network based on the local performance characterization values 32. In some implementations, the neighborhood fog node 40 changes a local operating characteristic 34 for one or more of the local fog nodes 30 that the neighborhood fog node 40 controls. For example, in some implementations, the neighborhood fog node 40 transmits an instruction to a local fog node 30 to change one of its local operating characteristics 34. In some implementations, the neighborhood fog node 40 changes an endpoint operating characteristic 24 for one or more of the endpoints 20 that the neighborhood fog node 40 controls. For example, in some implementations, the neighborhood fog node 40 transmits an instruction to an endpoint 20, via a local fog node 30, to change one of its endpoint operating characteristics 24.

In some implementations, the neighborhood fog nodes 40 change operating characteristics that are different from the operating characteristics that the local fog nodes 30 change. In some implementations, changing operating characteristics that the neighborhood fog nodes 40 change requires more than a threshold amount of computing resources. For example, in some implementations, changing the operating characteristics that the neighborhood fog nodes 40 change requires more computing resources than changing the operating characteristics that the local fog nodes 30 change. In some implementations, the neighborhood fog nodes 40 change operating characteristics that are less time sensitive that the operating characteristics that the local fog nodes 30 change (e.g., operating characteristics that do not require changes within a threshold amount of time). As an example, in some implementations, the neighborhood fog nodes 40 change operating characteristics that are related to channel allocation (e.g., allocating different communication channels/frequencies), load balancing (e.g., re-distributing load between local fog nodes 30 and/or endpoints 20), interference mitigation (e.g., changing error correction algorithms based on packet drop rate), and/or security (e.g., changing encryption algorithms based on security threat levels).

At 212, the neighborhood fog nodes 40 transmit neighborhood performance characterization values 42 to the regional nodes 50 that control the neighborhood fog nodes 40. In some implementations, a neighborhood fog node 40 generates its neighborhood performance characterization values 42 by selecting a portion of the local performance characterization values 32 that the neighborhood fog node 40 receives. For example, in some implementations, the neighborhood fog node 40 filters out the local performance characterization values 32 that the neighborhood fog node 40 has already processed (e.g., acted upon). As described herein, in some implementations, the neighborhood fog nodes 40 utilize data analytics and/or machine learning to generate the neighborhood performance characterization values 42. In some implementations, the neighborhood fog nodes 40 transmit the neighborhood performance characterization values 42 to their controlling regional fog nodes 50 periodically. In some implementations, a neighborhood fog node 40 transmits its neighborhood performance characterization values 42 in response to a request from the regional fog node 50 that controls the neighborhood fog node 40.

At 214, the regional fog node 50 changes an operating characteristic of the wireless network based on the neighborhood performance characterization values 42. In some implementations, the regional fog node 50 changes a neighborhood operating characteristic 44 for one or more of the neighborhood fog nodes 40 that the regional fog node 50 controls. For example, in some implementations, the regional fog node 50 transmits an instruction to a neighborhood fog node 40 to change one of its neighborhood operating characteristics 44. In some implementations, the regional fog node 50 changes a local operating characteristic 34 for one or more of the local fog nodes 30 that the regional fog node 50 controls (e.g., via a neighborhood fog node 40). For example, in some implementations, the regional fog node 50 transmits an instruction to a local fog node 30 to change one of its local operating characteristics 34. In some implementations, the regional fog node 50 changes an endpoint operating characteristic 24 for one or more of the endpoints 20 that the regional fog node 50 controls (e.g., via a neighborhood fog node 40 and/or a local fog node 30). For example, in some implementations, the regional fog node 50 transmits an instruction to an endpoint 20, via a neighborhood fog node 40 and/or a local fog node 30, to change one of its endpoint operating characteristics 24.

In some implementations, the regional fog nodes 50 change operating characteristics that are different from the operating characteristics that the neighborhood fog nodes 40 and/or the local fog nodes 30 change. In some implementations, the regional fog nodes 50 change operating characteristics whose adjustment requires more than a threshold amount of computing resources associated with the neighborhood fog nodes 40 and/or the local fog nodes 30. For example, in some implementations, the regional fog nodes 50 change operating characteristics that require more computing resources than the operating characteristics that the neighborhood fog nodes 40 and/or the local fog nodes 30 change. In some implementations, the regional fog nodes 50 change operating characteristics that are less time sensitive that the operating characteristics that the neighborhood fog nodes 40 and/or the local fog nodes 30 change (e.g., operating characteristics that do not require changes within a threshold amount of time associated with the neighborhood fog nodes 40 and/or the local fog nodes 30). As an example, in some implementations, the regional fog nodes 50 change operating characteristics that are related to network configuration, network monitoring and/or multi-access control mode.

At 216, the regional fog nodes 50 transmit regional performance characterization values 52 to the cloud computing servers 60 that control the regional fog nodes 50. In some implementations, a regional fog node 50 generates its regional performance characterization values 52 by selecting a portion of the neighborhood performance characterization values 42 that the regional fog node 50 receives. For example, in some implementations, the regional fog node 50 filters out the neighborhood performance characterization values 42 that the regional fog node 50 has already processed (e.g., acted upon). As described herein, in some implementations, the regional fog nodes 50 utilize data analytics and/or machine learning to generate the regional performance characterization values 52. In some implementations, the regional fog nodes 50 transmit the regional performance characterization values 52 to the cloud computing servers 60 periodically. In some implementations, a regional fog node 50 transmits its regional performance characterization values 52 in response to a request from the cloud computing servers 60 that control the regional fog node 50.

At 218, the cloud computing servers 60 change an operating characteristic of the wireless network based on the regional performance characterization values 52. In some implementations, the cloud computing servers 60 change a regional operating characteristic 54 for one or more of the regional fog nodes 50 that the cloud computing servers 60 control. For example, in some implementations, a cloud computing server 60 transmits an instruction to a regional fog node 50 to change one of its regional operating characteristics 54. In some implementations, the cloud computing servers 60 change a neighborhood operating characteristic 44 for one or more of the neighborhood fog nodes 40 that the cloud computing servers 60 control (e.g., via a regional fog node 50). For example, in some implementations, the cloud computing servers 60 transmit an instruction to a neighborhood fog node 40 to change one of its neighborhood operating characteristics 44. In some implementations, the cloud computing servers 60 change a local operating characteristic 34 for one or more of the local fog nodes 30 that the cloud computing servers 60 control (e.g., via a regional fog node 50 and/or a neighborhood fog node 40). For example, in some implementations, the cloud computing servers 60 transmit an instruction to a local fog node 30 to change one of its local operating characteristics 34. In some implementations, the cloud computing servers 60 change an endpoint operating characteristic 24 for one or more of the endpoints 20 that the cloud computing servers 60 control (e.g., via a regional fog node 50, a neighborhood fog node 40 and/or a local fog node 30). For example, in some implementations, the cloud computing servers 60 transmit an instruction to an endpoint 20, via a regional fog node 50, a neighborhood fog node 40 and/or a local fog node 30, to change one of its endpoint operating characteristics 24.

In some implementations, the cloud computing servers 60 change operating characteristics that are different from the operating characteristics that the regional fog nodes 50, the neighborhood fog nodes 40 and/or the local fog nodes 30 change. In some implementations, the cloud computing servers 60 change operating characteristics whose adjustment requires more than a threshold amount of computing resources associated with the regional fog nodes 50, the neighborhood fog nodes 40 and/or the local fog nodes 30. For example, in some implementations, the cloud computing servers 60 change operating characteristics whose adjustment requires more computing or storage resources than the operating characteristics that the regional fog nodes 50, the neighborhood fog nodes 40 and/or the local fog nodes 30 change. In some implementations, the cloud computing servers 60 change operating characteristics that are less time sensitive that the operating characteristics that the regional fog nodes 50, the neighborhood fog nodes 40 and/or the local fog nodes 30 change (e.g., operating characteristics that do not require changes within a threshold amount of time associated with the regional fog nodes 50, the neighborhood fog nodes 40 and/or the local fog nodes 30). As an example, in some implementations, the cloud computing servers 60 change operating characteristics that are related to network efficiency and/or network troubleshooting. In some implementations, the cloud computing servers 60 utilize methods, systems and/or devices associated with machine learning to change the operating characteristics of the wireless network. Since methods associated with machine learning are typically computationally intensive, the cloud computing servers 60 are better suited to change operating characteristics that require machine learning than the regional fog nodes 50, the gateway fog nodes 40 and/or the local fog nodes 30.

Figure 3:
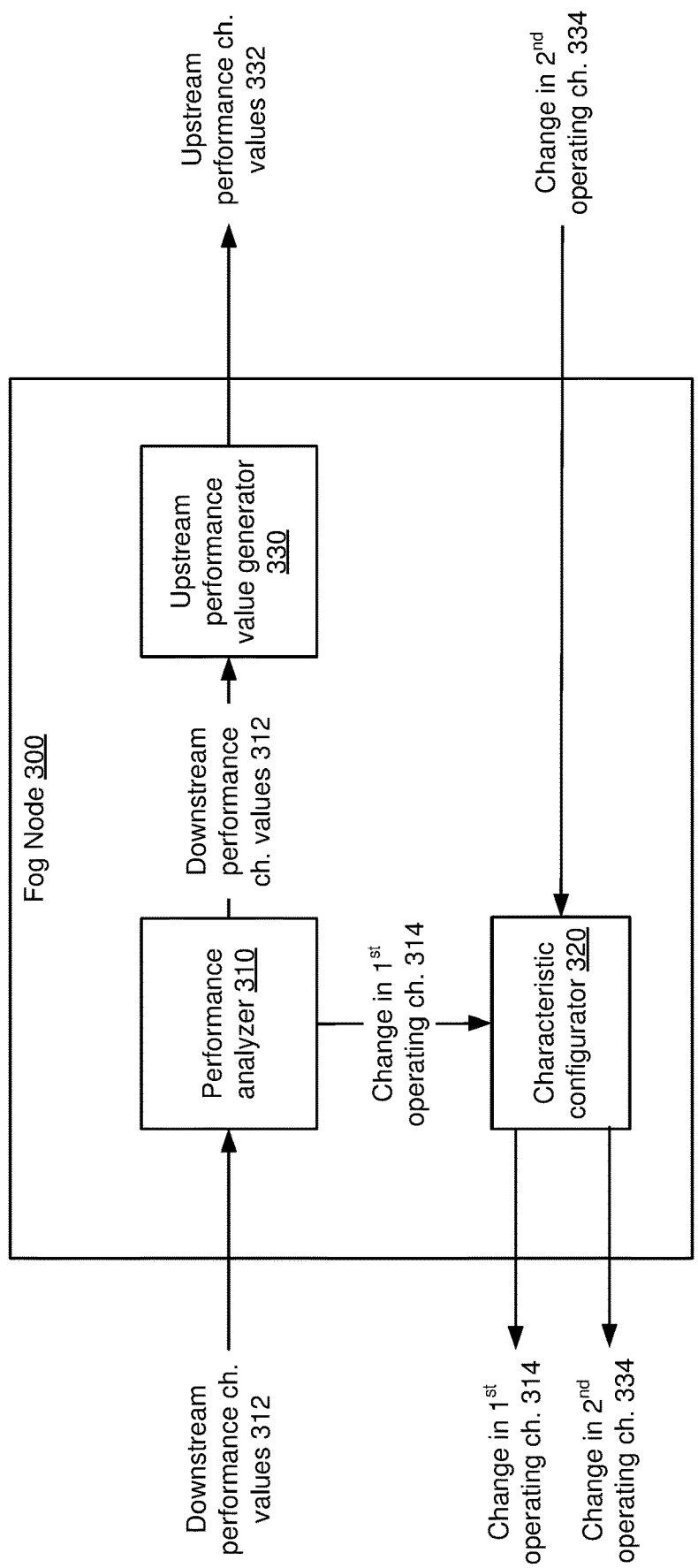
FIG. 3 is a block diagram of a fog node in accordance with some implementations.

FIG. 3 is a block diagram of a fog node 300 in accordance with some implementations. In some implementations, the fog node 300 represents one or more of the local fog nodes 30, the neighborhood log nodes 40 and the regional fog nodes 50 shown in FIGS. 1 and 2. In various implementations, the fog node 300 includes a performance analyzer 310, a characteristic configurator 320, and an upstream performance value generator 330. Briefly, in various implementations, the performance analyzer 310 obtains downstream performance characterization values 312 and determines a change 314 in a first operating characteristic, the characteristic configurator 320 changes a first operating characteristic based on the change 314, the upstream performance value generator 330 generates upstream performance characterization values 332 based on a function of the downstream performance characterization values 312, and the characteristic configurator 320 changes a second operating characteristic based on a change 334 in the second operating characteristic.

In various implementations, the performance analyzer 310 obtains downstream performance characterization values 312 and determines a change 314 in a first operating characteristic based on the downstream performance characterization values 312. In some implementations, the fog node 300 obtains the downstream performance characterization values 312 from a device (e.g., another fog node, or an endpoint) that is downstream relative to the fog node 300 in a hierarchy. For example, in some implementations, the fog node 300 represents a local fog node 30 and the downstream performance characterization values 312 include the endpoint performance characterization values 22 that the local fog node 30 receives from the endpoints 20 that the local fog node 30 controls. In some implementations, the fog node 300 represents a neighborhood fog node 40 and the downstream performance characterization values 312 include local performance characterization values 32 that the neighborhood fog node 40 receives from the local fog nodes 30 that the neighborhood fog node 40 controls. In some implementations, the fog node 300 represents a regional fog node 50 and the downstream performance characterization values 312 include neighborhood performance characterization values 42 that the regional fog node 50 receives from the neighborhood fog nodes 40 that the regional fog node 50 controls.

In various implementations, the performance analyzer 310 determines a change 314 in a first operating characteristic of the wireless network based on the downstream performance characterization values 312. In some implementations, the change 314 includes a change to one or more operating characteristics of a device that is downstream relative to the fog node 300. For example, in some implementations, the fog node 300 represents a local fog node 30, and the change 314 includes a change in one or more endpoint operating characteristics 24 of endpoints 20 controlled by the fog node 300. In some implementations, the fog node 300 represents a neighborhood fog node 40, and the change 314 includes a change in one or more local operating characteristics 34 of local fog nodes 30 controlled by the neighborhood fog node 40. In some implementations, the fog node 300 represents a regional fog node 50, and the change 314 includes a change in one or more neighborhood operating characteristics 44 of neighborhood fog nodes 40 controlled by the regional fog node 50. In some implementations, the change 314 includes change to one or more operating characteristics of the fog node 300 itself. In some implementations, the change 314 requires an amount of computing resources that satisfies (e.g., is less than) a threshold amount of computing resources. For example, in some implementations, the change 314 requires an amount of computing resources that are not available to fog nodes that are downstream relative to the fog node 300. In some implementations, the change 314 is performed within an amount of time that satisfies (e.g., is less than) a threshold amount of time.

In various implementations, the characteristic configurator 320 changes the first operating characteristic in accordance with the change 314 determined by the performance analyzer 310. In some implementations, the characteristic configurator 320 transmits an instruction to a downstream fog node to change the first operating characteristic in accordance with the change 314. For example, in some implementations, the characteristic configurator 320 transmits an instruction indicating the change 314 to a neighborhood fog node 40, a local fog node 30 and/or an endpoint 20 that the fog node 300 controls. In some implementations, the first operating characteristic is associated with the fog node 300, and the characteristic configurator 320 changes the first operating characteristic in accordance with the change 314.

In various implementations, the upstream performance value generator 330 generates the upstream performance characterization values 332 based on a function of the downstream performance characterization values 312. For example, in some implementations, the upstream performance value generator 330 arrives at the upstream performance characterization values 332 by selecting a portion of the downstream performance characterization values 312. In some implementations, the upstream performance value generator 330 generates the upstream performance characterization values 332 by performing data analytics on the downstream performance characterization values 312. For example, in some implementations, the upstream performance characterization values 332 are an average/mean of the downstream performance characterization values 312. In some implementations, the upstream performance value generator 330 utilizes methods and/or systems associated with machine learning to generate the upstream performance characterization values 332. For example, in some implementations, the upstream performance value generator 330 utilizes machine learning to assign weights/ranks to the downstream performance characterization values 312, and arrive at the upstream performance characterization values 332 by selecting those downstream performance characterization values 312 that are associated with higher weights/ranks.

In some implementations, the upstream performance value generator 330 filters out a portion of the downstream performance characterization values 312 that the fog node 300 has acted upon. For example, in some implementations, the upstream performance value generator 330 filters out the portion of the downstream performance characterization values 312 that the performance analyzer 310 based the change 314 on.

In some implementations, the fog node 300 represents a local fog node 30, and the upstream performance characterization values 332 include local performance characterization values 32. In some implementations, the fog node 300 represents a neighborhood fog node 40, and the upstream performance characterization values 332 include neighborhood performance characterization values 42. In some implementations, the fog node 300 represents a regional fog node 50, and the upstream performance characterization values 332 include regional performance characterization values 52. In various implementations, the fog node 300 transmits the upstream performance characterization values 332 to a device that is upstream relative to the fog node 300 in the hierarchy. For example, in some implementations, the fog node 300 represents a local fog node 30, and the fog node 300 transmits the upstream performance characterization values 332 to a neighborhood fog node 40 that controls the local fog node 30. In some implementations, the fog node 300 represents a neighborhood fog node 40, and the fog node 300 transmits the upstream performance characterization values 332 to a regional fog node 50 that controls the neighborhood fog node 40. In some implementations, the fog node 300 represents a regional fog node 50, and the fog node 300 transmits the upstream performance characterization values 332 to the cloud computing servers 60.

In various implementations, the fog node 300 receives an instruction indicating a change 334 to a second operating characteristic of the wireless network. In some implementations, the fog node 300 receives the instruction in response to transmitting the upstream performance characterization values 332. In some implementations, the fog node 300 receives an indication of the change 334 from a device that is upstream relative to the fog node 300 in the hierarchy. In some implementations, the fog node 300 receives the indication of the change 334 from the same device to which the fog node 300 transmitted the upstream performance characterization values 332. In some implementations, the characteristic configurator 320 changes the second operating characteristic of the wireless network in accordance with the change 334. In some implementations, the characteristic configurator 320 filters changes passing through the characteristic configurator 320 (e.g. if the change 334 contradicts the change 314, the characteristic configurator 320 revokes/cancels/deletes the change 314 and transmits an indication of the change 334). In some implementations, the second operating characteristic is associated with a device that is downstream relative to the fog node 300 in the hierarchy. In such implementations, the characteristic configurator 320 transmits an instruction to the downstream device indicating the change 334 in the second operating characteristic. In some implementations, the second operating characteristic is different from the first operating characteristic. In some implementations, the second operating characteristic is associated with more devices than the first operating characteristic. For example, in some implementations, the change 314 to the first operating characteristic applies to one of the endpoints 20 controlled by the fog node 300, whereas the change 334 to the second operating characteristic applies to multiple (e.g., all) endpoints 20 controlled by the fog node 300. In some implementations, the change 314 to the first operating characteristic applies to devices at a single hierarchical level, whereas the change 334 to the second operating characteristic applies across devices at multiple hierarchical levels. For example, in some implementations, the change 314 to the first operating characteristic applies to endpoints 20, and the change 334 to the second operating characteristic applies to endpoints 20 and local fog nodes 30.

Figure 4:
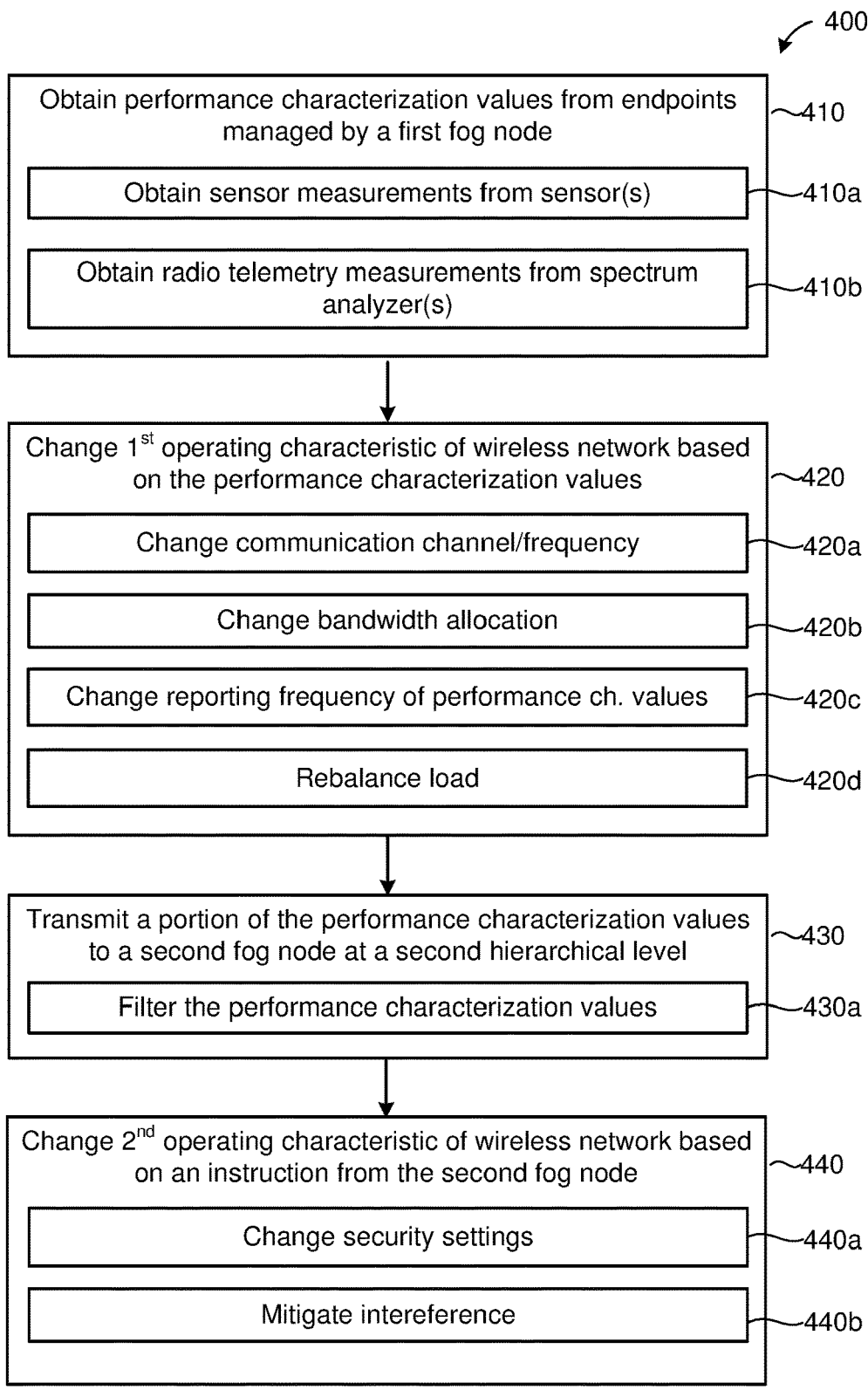
FIG. 4 is a flowchart representation of a method for changing operating characteristics of a wireless network in accordance with some implementations.

FIG. 4 is a flowchart representation of a method 400 for changing operating characteristics of a wireless network in accordance with some implementations. In various implementations, the method 400 is implemented as a set of computer readable instructions that are executed at a device (e.g., a fog node, for example, one or more of the local fog nodes 30, the neighborhood fog nodes 40 and/or the regional fog nodes 50 shown in FIGS. 1 and 2, and/or the fog node 300 shown in FIG. 3). Briefly, the method 400 includes obtaining, by a first fog node at a first hierarchical level, performance characterization values from endpoints, changing a first operating characteristic of a wireless network based on the performance characterization values, transmitting a portion of the performance characterization values to a second fog node at a second hierarchical level, and changing a second operating characteristic of the wireless network based on an instruction from the second fog node.

As represented by block 410, in various implementations, the method 400 includes obtaining performance characterization values from endpoints managed (e.g., controlled) by a first fog node. In some implementations, the method 400 is performed by a local fog node 30, and the method 400 includes receiving the endpoint performance characterization values 22 from endpoints 20 controlled by the local fog node 30. In some implementations, the method 400 is performed by a neighborhood fog node 40, and the method 400 includes receiving the local performance characterization values 32 from local fog nodes 30 controlled by the neighborhood fog node 40. In some implementations, the method 400 is performed by a regional fog node 50, and the method 400 includes receiving the neighborhood performance characterization values 42 from neighborhood fog nodes 40 controlled by the regional fog node 50. As represented by block 410a, in some implementations, the method 400 includes obtaining (e.g., receiving) sensors measurements from sensors (e.g., temperature readings from temperature sensors, pressure readings from barometers, voltage values from voltmeters, current values from ammeters, etc.). As represented by block 410b, in some implementations, the method 400 includes obtaining radio telemetry measurements from RF telemetry devices such as spectrum analyzers (e.g., receiving SNR values, signal interference/attenuation levels, etc.).

As represented by block 420, in various implementations, the method 400 includes changing a first operating characteristic of the wireless network based on the performance characterization values. In some implementations, the first operating characteristic is associated with a device downstream relative to the first fog node (e.g., an endpoint). As such, in some implementations, the method 400 includes changing the first operating characteristic of an endpoint controlled by the first fog node. In some implementations, determining the change to the first operating characteristic requires an amount of computing resources that is less than a threshold amount of computing resource associated with the first fog node. In other words, in some implementations, determining the adjustment to the first operating characteristic requires an amount of computing resources that are available at the first fog node.

As represented by block 420a, in some implementations, the method 400 includes changing a communication channel/frequency by which a downstream device (e.g., an endpoint and/or a fog node at a lower hierarchical level) communicates. In some implementations, the method 400 includes changing the communication channel/frequency in response to the performance characterization values indicating signal interference that breaches (e.g., exceeds) an interference threshold. In some implementations, changing the communication channel/frequency satisfies the interference threshold (e.g., changing the communication channel/frequency results in interference that is below the interference threshold). In some implementations, the method 400 includes changing the communication channel/frequency in response to the performance characterization values indicating a SNR that breaches (e.g., is below) a threshold SNR. In some implementations, changing the communication channel/frequency results in a SNR that satisfies the threshold SNR (e.g., changing the communication channel/frequency results in a SNR that is above the threshold SNR).

As represented by block 420b, in some implementations, the method 400 includes changing a bandwidth allocation for a downstream device. In some implementations, the method 400 includes increasing the bandwidth allocation in response to the performance characterization values indicating that the downstream device is to transmit more data (e.g., in response to a bandwidth utilization being within a threshold of the bandwidth allocation, for example, in response to the bandwidth utilization being within 90% of the bandwidth allocation). In some implementations, the method includes decreasing the bandwidth allocation in response to the performance characterization values indicating that the downstream device is to transmit less data (e.g., in response to a bandwidth utilization being less than a predefined amount, for example, in response to the bandwidth utilization being less than 50% of the bandwidth allocation).

As represented by block 420c, in some implementations, the method 400 includes changing a reporting frequency of the performance characterization values based on the performance characterization values. For example, in some implementations, the method 400 includes instructing the endpoints to transmit fewer sensor measurements in response to the performance characterization values indicating that the endpoints are operating within acceptable parameters. In some implementations, the method 400 includes instructing the endpoints to transmit additional sensors measurements in response to the performance characterization values indicating that the endpoints are operating outside of acceptable parameters. In some implementations, the method 400 includes changing sensor reporting frequency based on historical sensor measurements (e.g., reducing reporting frequency in response to historical sensor measurements being relatively static, and/or increasing reporting frequency in response to historical sensor measurements being relatively dynamic).

As represented by block 420d, in some implementations, the method 400 includes rebalancing load between downstream devices. For example, in some implementations, the method 400 includes re-distributing a number/percentage of performance characterization values reported by the endpoints controlled by the first fog node. In some implementations, the method 400 includes rebalancing the load in response to performance characterization values indicating that the load on one or more downstream devices breaches a load threshold. In some implementations, rebalancing the load satisfies the load threshold.

In some implementations, the method 400 includes rebalancing signal transmissions from the endpoints to the first fog node.

As represented by block 430, in some implementations, the method 400 includes transmitting a portion of the performance characterization values to a second fog node at a second hierarchical level. In some implementations, the second hierarchical level is above the first hierarchical level, and the first fog node is controlled by the second fog node.

More generally, in various implementations, the method 400 includes generating and transmitting upstream performance characterization values (e.g., the upstream performance characterization values 332 shown in FIG. 3) based on a function of downstream performance characterization values (e.g., the downstream performance characterization values 312). As represented by block 430a, in some implementations, the method 400 includes arriving at the portion of the performance characterization values by filtering the performance characterization values obtained by the first fog node. In some implementations, the method 400 includes filtering out a portion of the performance characterization values that the first fog node has processed (e.g., acted upon). For example, in some implementations, the method 400 includes filtering out the portion of the performance characterization values that were used to determine the change in the first operating characteristic of the wireless network. As described herein, in some implementations, the method 400 includes arriving at the portion of the performance characterization values by performing data analytics on the performance characterization values (e.g., to reduce a size of the performance characterization values that are transmitted upstream to the second fog node). As described herein, in some implementations, the method 400 includes utilizing methods and/or systems associated with machine learning to arrive at the portion of the performance characterization values.

As represented by block 440, in some implementations, the method 400 includes changing a second operating characteristic of the wireless network based on an instruction received from/via the second fog node. In some implementations, the second operating characteristic is different from the first operating characteristic. For example, in some implementations, the first operating characteristic is associated with endpoints controlled by the first fog node, and the second operating characteristic is associated with the first fog node and peers of the first fog node that are controlled by the second fog node. In some implementations, the first operating characteristic is associated with endpoints controlled by the first fog node, and the second operating characteristic is associated with endpoints controlled by the second fog node (e.g., including endpoints that are controlled by peers of the first fog node and not the first fog node). In some implementations, the method 400 includes determining whether the change to the second operating characteristic conflicts with the change to the first operating characteristic. In some implementations, the method 400 includes discarding the change to the first operating characteristic in response to the change to the first operating characteristic being in conflict with the change to the second operating characteristic.

As described herein, in some implementations, determining the change to the second operating characteristic requires an amount of computing resources that is greater than an amount of computing resources available to the first fog node. As represented by block 440a, in some implementations, the method 400 includes changing security settings. For example, in some implementations, the method 400 includes changing an encryption algorithm associated with the communications propagating in the wireless network. As represented by block 440b, in some implementations, the method 400 includes changing an operating characteristic that results in mitigating interference. In various implementations, changing the operating characteristics of the wireless network results in an increase in spectral efficiency.

Figure 5:
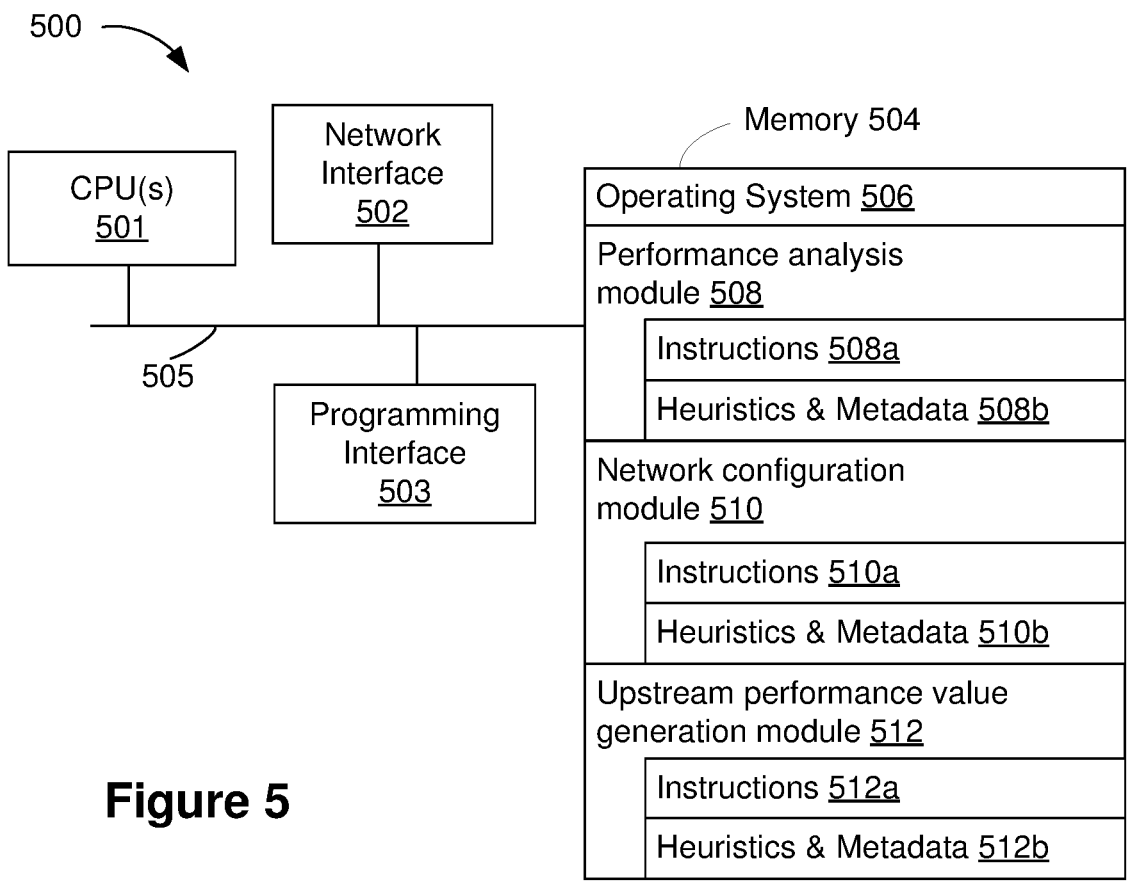
FIG. 5 is a block diagram of a server system enabled with various modules that are provided to change operating characteristics of a wireless network in accordance with some implementations.

FIG. 5 is a block diagram of a server system 500 enabled with one or more components of a device (e.g., a fog node, for example, one or more of the local fog nodes 30, the neighborhood fog nodes 40 and/or the regional fog nodes 50 shown in FIGS. 1 and 2, and/or the fog node 300 shown in FIG. 3) that changes operating characteristics of a wireless network (e.g., the endpoint operating characteristics 24, the local operating characteristics 34, the neighborhood operating characteristics 44 and/or the regional operating characteristics 54 shown in FIGS. 1 and 2). While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In various implementations, the network interface 502 allows the server system 500 to communicate with devices that are upstream or downstream relative to the server system 500 in a hierarchy. In some implementations, the communication buses 505 include circuitry that interconnects and controls communications between system components. The memory 504 includes high-speed random access memory, such as DRAM, SRAM, DDR RAM or other random access solid state memory devices and may include non-volatile memory, such as one or more magnetic disk storage devices, optical disk storage devices, flash memory devices, or other non-volatile solid state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a performance analysis module 508, a network configuration module 510, and an upstream performance value generation module 512. In various implementations, the performance analysis module 508, the network configuration module 510 and the upstream performance value generation module 512 perform substantially the same operations as the performance analyzer 310, the characteristic configurator 320 and the upstream performance value generator 330, respectively. For example, in some implementations, the performance analysis module 508 obtains performance characterization values and determines a change to a first operating characteristic based on the performance characterization values. To that end, in various implementations, the performance analysis module 508 includes instructions and/or logic 508a, and heuristics and metadata 508b. In various implementations, the network configuration module 510 changes the first operating characteristic based on the change to the first operating characteristic determined by the performance analysis module 508. To that end, in various implementations, the network configuration module 510 includes instructions and/or logic 510a, and heuristic and metadata 510b. In various implementations, the upstream performance value generation module 512 arrives at a portion of the performance characterization values based on a function of the performance characterization values (e.g., by filtering the performance characterization values, by performing data analytics on the performance characterization values and/or via machine learning). To that end, in various implementations, the upstream performance value generation module 512 includes instructions and/or logic 512a, and heuristics and metadata 512b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a first node associated with a first hierarchical level in a hierarchy of nodes of a wireless network, wherein the wireless network provides cellular coverage and Wi-Fi coverage:
obtaining, from one or more of a plurality of endpoints managed by the first node, performance characterization values associated with radio frequency (RF) data for the wireless network and sensor measurements for one or more of the plurality of endpoints;
changing a first operating characteristic of the wireless network based on the performance characterization values, wherein changing the first operating characteristic changes one or more endpoint operating characteristics for one or more of the plurality of endpoints;
transmitting a portion of the performance characterization values to a second node at a second hierarchical level in the hierarchy of nodes; and
changing a second operating characteristic of the wireless network based on an instruction from the second node, wherein changing the second operating characteristic changes one or more operations of one or more of the first node and other nodes at the first hierarchical level.

2. The method of claim 1, wherein changing one or more of the first operating characteristic and the second operating characteristic satisfies an operating threshold for the wireless network.

3. The method of claim 1, further comprising:
transmitting an instruction to at least one endpoint of the plurality of endpoints to change at least one endpoint operating characteristic of the at least one endpoint of the plurality of endpoints.

4. The method of claim 1, wherein changing the first operating characteristic includes rebalancing a load between the plurality of endpoints.

5. The method of claim 1, wherein changing the first operating characteristic includes rebalancing signal transmissions from the plurality of endpoints to the first node.

6. The method of claim 1, wherein changing the second operating characteristic includes switching a communication channel on which one or more of the plurality of endpoints communicate with the first node.

7. The method of claim 1, wherein changing the second operating characteristic includes changing a bandwidth allocation for one or more of the plurality of endpoints.

8. The method of claim 1, wherein transmitting the portion of the performance characterization values to the second node includes filtering the performance characterization values to arrive at the portion of the performance characterization values.

9. A first node associated with a first hierarchical level in a hierarchy of nodes configured to collectively manage one or more operating characteristics of a wireless network that provides cellular coverage and Wi-Fi coverage, the first node comprising:
a processor provided to execute computer readable instructions included on a non-transitory memory; and
a non-transitory memory including computer readable instructions, that when executed by the processor, cause the first node to perform operations, comprising:
obtaining, from one or more of a plurality of endpoints managed by the first node, performance characterization values associated with radio frequency (RF) data for the wireless network and sensor measurements for one or more of the plurality of endpoints;
changing a first operating characteristic of the wireless network based on the performance characterization values, wherein changing the first operating characteristic changes one or more endpoint operating characteristics for one or more of the plurality of endpoints;
transmitting a portion of the performance characterization values to a second node at a second hierarchical level in the hierarchy of nodes; and
changing a second operating characteristic of the wireless network based on an instruction from the second node, wherein to change the second operating characteristic changes one or more operations of one or more of the first node and other nodes at the first hierarchical level.

10. The first node of claim 9, wherein changing the first operating characteristic includes rebalancing a load between the plurality of endpoints.

11. The first node of claim 9, wherein the instructions, when executed by the processor, cause the first node to perform further operations, comprising:
transmitting an instruction to at least one endpoint of the plurality of endpoints to change at least one endpoint operating characteristic of the at least one endpoint of the plurality of endpoints.

12. The first node of claim 9, wherein changing the first operating characteristic includes rebalancing signal transmissions from the plurality of endpoints to the first node.

13. The first node of claim 9, wherein changing the second operating characteristic includes switching a communication channel on which one or more of the plurality of endpoints communicate with the first node.

14. The first node of claim 9, wherein changing the second operating characteristic includes changing a bandwidth allocation for one or more of the plurality of endpoints.

15. The first node of claim 9, wherein transmitting the portion of the performance characterization values to the second node includes filtering the performance characterization values to arrive at the portion of the performance characterization values.

16. The first node of claim 9, wherein changing the second operating characteristic includes receiving the instruction from the second node in response to transmitting the portion of the performance characterization values to the second node.

17. One or more non-transitory computer readable storage media including instructions that, when executed by a processor, cause the processor to perform operations, comprising:
obtaining, from one or more of a plurality of endpoints managed by a first node associated with a first hierarchical level in a hierarchy of nodes configured to collectively manage one or more operating characteristics of a wireless network, performance characterization values associated with radio frequency (RF) data for the wireless network and sensor measurements for one or more of the plurality of endpoints, wherein the wireless network provides cellular coverage and Wi-Fi coverage;
changing a first operating characteristic of the wireless network based on the performance characterization values, wherein changing the first operating characteristic changes one or more endpoint operating characteristics for one or more of the plurality of endpoints;

transmitting a portion of the performance characterization values to a second node at a second hierarchical level in the hierarchy of nodes; and changing a second operating characteristic of the wireless network based on an instruction from the second node, wherein to change the second operating characteristic changes one or more operations of one or more of the first node and other nodes at the first hierarchical level.

18. The media claim 17, wherein changing one or more of the first operating characteristic and the second operating characteristic satisfies an operating threshold for the wireless network.

19. The media of claim 18, wherein the operating threshold is satisfied by changing one or more of the first operating characteristic and the second operating characteristic within an amount of time indicated by the operating threshold.

20. The media of claim 17, wherein the instructions, when executed by the processor, cause the processor to perform further operations, comprising:

transmitting an instruction to at least one endpoint of the plurality of endpoints to change at least one endpoint operating characteristic of the at least one endpoint of the plurality of endpoints.

\* \* \* \* \*